United States Patent [19]

Bonke

[11] Patent Number: 4,914,529
[45] Date of Patent: Apr. 3, 1990

[54] DATA DISK DEFECT HANDLING USING RELOCATION ID FIELDS

[75] Inventor: Carl Bonke, Rancho Santa Margarita, Calif.

[73] Assignee: Western Digital Corp., Irvine, Calif.

[21] Appl. No.: 220,552

[22] Filed: Jul. 18, 1988

[51] Int. Cl.[4] .................................................. G11B 5/09
[52] U.S. Cl. ........................................................ 360/48
[58] Field of Search ............... 369/54, 58, 59; 360/31, 360/39, 48, 49, 53, 63; 324/212

[56] References Cited

U.S. PATENT DOCUMENTS 4,630,140 12/1986 Sugimura et al. ..................... 360/48

FOREIGN PATENT DOCUMENTS 55-55580 4/1982 Japan ..................................... 360/49

OTHER PUBLICATIONS

Magnetic Peripherals, Inc., *Preliminary Product Specification for 97704 Intelligent Hydro Drive*, Doc. 64401500, Mar. 1986.

Primary Examiner—Vincent P. Canney
Attorney, Agent, or Firm—Christie, Parker & Hale

[57] ABSTRACT

The invention provides a method and format for storing a relocation identification block within the data field of a sector having a defect. The relocation identification block provides an address for a replacement sector to be used for data which cannot be stored in the unusable sector.

2 Claims, 1 Drawing Sheet

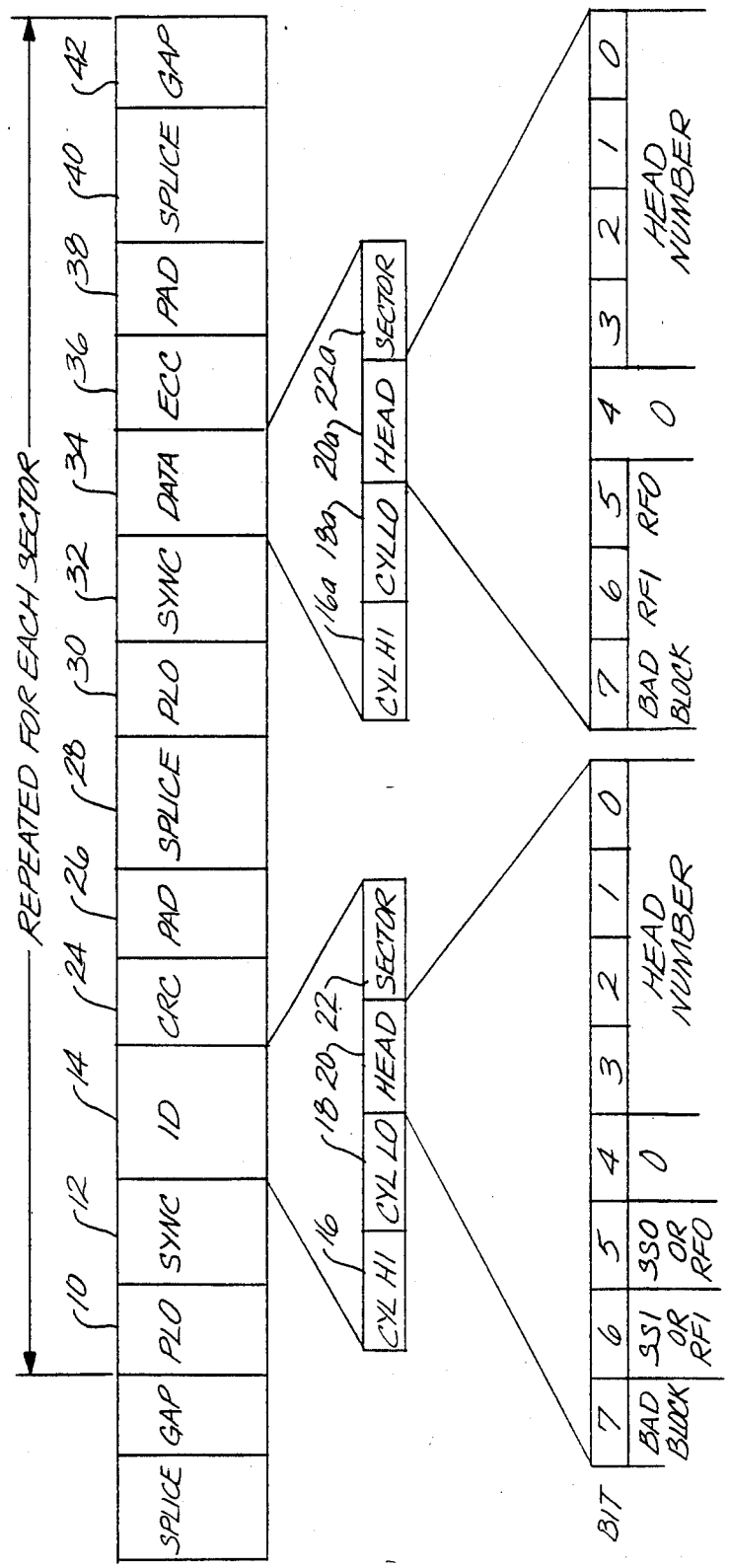

DATA DISK DEFECT HANDLING USING RELOCATION ID FIELDS

This invention relates generally to the field of data defect handling in computer disk drives. More particularly, the invention provides a method for storing a relocation identification block within the data field of a sector having a defect. The relocation block provides an address for a replacement sector for the unusable sector.

BACKGROUND OF THE INVENTION

Hard disks for data storage by host microcomputers often contain defects in the media of the disk platters which preclude writing of data at certain locations. During formatting of sectors in the disk tracks, such defects are located and mapped. Methods exist in the prior art for marking defects or "bad blocks" in the media to allow the host microcomputer or the microprocessor disk controller to provide alternate storage locations as replacements.

Typically, an identification field is provided in the data format for each sector formatted onto a disk track. Typically, one bit located in the ID field provides a bad block marker. Assertion of the bad block marker informs the microcontroller or host computer that a defect exists in the sector. Consequently, the sector is unusable for data storage. Data which would normally be stored in the sector must be relocated to another sector on the disk. Some prior art systems provide automatic diversion to spare sectors located on the same track for storage replacement. Certain approaches provide renumbering of the sectors to avoid the bad block.

Other prior art systems provide pointer systems directing the microcontroller or host computer to the alternate sector. One such system replaces the ID field in the bad block with the ID address of the replacement sector.

Defect handling techniques which may be used with minimum impact from a data transfer time standpoint are required. Defect handling in "zero latency" data read systems must accommodate continued data transfer when a bad block is encountered.

SUMMARY OF THE INVENTION

The present invention provides a method and data format to accomplish alternate sector location for bad block data storage. A bit within the identification field for the sector is provided to designate a bad block. At least one second bit in the ID field is designated as a mapped flag to indicate the data has been placed in an alternate sector. A duplicate ID field is created providing a sector location for the remapped data. The alternate ID field is stored in a non-degraded portion of the data field. Data is written in the sector designated by the alternate ID field. The alternate sector ID field does not have the bad block mark asserted. However, the bit designating a mapped flag in the bad block sector is asserted, designating a relocation flag indicating the sector is a relocated data sector.

DESCRIPTION OF THE DRAWINGS

FIG. 1 is a diagram of the data format with detailed expansions of the identification field and alternate identification field located within the data field.

DETAILED DESCRIPTION OF THE INVENTION

The present invention provides a method and format for data defect handling which is usable with numerous data disk peripheral controllers and data transfer techniques. In particular, the invention is applicable to systems employing architectures as described in the patent application to Carl Bonke, et al, entitled "Data Recording System Buffer Management and Multiple Host Interface Control," and the application to Bonke, et al, entitled "Method and Disk Controller Architecture for Zero Latency Data Read," both applications filed substantially concurrently herewith having a common assignee, the disclosures of which are both incorporated herein by reference.

The data format of the invention is shown in FIG. 1. The PLO field 10 is a frequency pattern used to lock a data separator phase lock loop to the data rate. The following sync field 12 provides a second pattern to establish byte synchronization for data transfer. The ID field 14 comprises four bytes of information, a first byte designating the most significant bits of the cylinder CYLHI 16, a second byte designating the least significant bits of the cylinder CYLLO 18, a third byte designating the head 20, and a fourth byte designating the sector 22.

The bits of the third byte designating the head provide information in addition to the head number. Bit 7 is designated the bad block bit. Bit 6 and bit 5 designated SS1 and SS0 provide an encoded sector size. Alternatively, bits 6 and 5 are the mapped flag bits which will be described in greater detail later. Bits 3, 2, 1 and 0 designate the head number on the disk drive.

The CRC field 24 of the sector format provides cyclic recurring check sum data for error verification during data transfer. A PAD 26 comprising a low frequency pattern separates the CRC field from the SPLICE field 28. The SPLICE field is an interruption in readable data to accommodate transient data on the media from write circuit turn-on and turn-off times. A second PLO field 30 and a second sync field 32 precede the data field 34. The data field normally contains data written to the sector.

If a defect exists in the media of the disk in the data field, the bad block mark in the ID field will be set during formatting of the disk. If the bad block mark is set and the capability of the invention is to be employed, an alternate ID field is then provided in the data field designating an alternate sector for storage of the data. The alternate ID field comprises bytes designating the cylinder high 16A, cylinder low 18A, head 20A, and sector 22A.

The head byte provides a similar format to that of the original ID field. Byte 7 provides a bad block mark which is not asserted. The peripheral controller will ignore sector sizing and bits 6 and 5 of the head byte will be interpreted for ID field relocation. A "0-1" in bits 6 and 5 indicate the alternate ID field has sector, head and cylinder where sector is relocated. A "1-1" indicates relocation of the entire track and the alternate ID field provides head and cylinder location of the replacement track; sector number is ignored. Bits 3, 2, 1 and 0 provide a head number.

The ECC field 36 provides for error-correcting codes for error detection and correction. A second pad field 38 and splice field 40 are provided, and a gap field 42 is inserted to accounted for moderate speed tolerance and to allow for intersector processing.

Data which would normally be stored in the defective sector is now stored in the alternate sector having the location defined by the alternate ID field. The ID field of the relocation sector contains the same format. In operation, during a data read from the disk, when the ID field of the bad block is read by the peripheral controller, the bad block bit will be read. The peripheral controller will interrupt its microprocessor controller if the relocation feature of the invention has been selected. The microcontroller will cause the peripheral controller to execute a scan ID command, as described in the application to Bonke, et al, for a Method and Disk Controller Architecture for Zero Latency Data Read, which will be executed when the next PLO and sync fields provide byte framing. This PLO and sync field normally precede the data field. However, in formatting the bad block, the alternate ID field has been stored in the data field. Therefore, the scan ID command will result in detection of the alternate ID field providing the sector location bytes for the microcontroller.

The microcontroller may then command the peripheral controller to continue reading data from the current track if in a zero latency read mode, or may immediately seek to the alternate sector location defined by the alternate ID block to recover the data stored in the alternate sector.

The format and method employed by the invention provide a significant advantage over the prior art in maintaining data transfer rates from a disk to a host computer when defects in the media are encountered. Placing the alternate ID field in the data field of the bad block provides sufficient time delay for microcontroller interrupt and command generation, and, in the case of a zero latency read, completion of reading the current track may be accomplished without interruption.

Placement of the alternate ID field in the data field of the bad block may still be accomplished if the defect location would fall coincident with the defect location. During formatting, the PLO field 30 may be extended, thereby offsetting the alternate ID field from the defect.

Similarly, if the defect occurs in the ID field of the sector, modification and extension of the gap and first PLO field 10 may be accomplished to offset the ID field 14 from the defect.

Having now described the invention in detail as required by the Patent Statutes, those skilled in this art will have no difficulty in making changes and modifications to the format and method of the invention to meet specific requirements or conditions. Such changes and modifications may be made without departing from the scope and spirit of the invention as set forth in the following claims.

What is claimed is:

1. A method for data relocation due to disk media defects comprising providing:

an alternate storage sector having an identification field;

asserting a bad block bit and a mapped flag bit in the ID field of the defective sector;

storing an alternate ID field corresponding to the alternate sector in the data field of the defective sector only if the sector is defective;

reading the bad block bit during data transfer;

reading the alternate sector ID from the data field;

completing data transfer from the current track;

seeking to the alternate sector defined by the alternate ID present in the data field; and reading the data stored in the alternate sector.

2. A record with a data format for sectors of a disk track comprising:

a first ID field including a definition byte having a bad block bit and a mapped flag bit;

a data field for normal data storage located within the sector defined by the first identification field;

a second identification field having identical format with the first identification field, the second identification field stored in the data field of the sector when a media defect is present in the data field.

* * * * *